United States Patent Office 3,373,128
Patented Mar. 12, 1968

3,373,128
STABLE GELLED DISPERSIONS OF HYDROXYL TERMINATED URETHANE POLYMERS
George S. Wooster, Hamburg, N.Y., assignor to Allied Chemical Corporation, New York, N.Y., a corporation of New York
No Drawing. Filed Feb. 12, 1964, Ser. No. 344,256
3 Claims. (Cl. 260—29.1)

ABSTRACT OF THE DISCLOSURE

Production of stable hydroxyl terminated urethane polymer gel dispersions having a viscosity within the range of D to H on the Gardner-Holdt scale at 20–25% non-volatiles and a hydroxyl number of within the range of 30–40, adapted for use in the production of non-penetrating urethane coatings by blending (1) a low viscosity hydroxyl terminated urethane polymer gel dispersed in a solvent free of active hydrogen containing groups, said viscosity being less than D on the Gardner scale at 20–25% non-volatiles, said hydroxyl terminated urethane polymer having a hydroxyl number in the range of 30 to 40 (2) a high viscosity hydroxyl terminated urethane polymer gel dispersed in a solvent free of active hydrogen containing groups as determined by the Zerewitinoff method, said viscosity being greater than H on the Gardner scale at 20–25% non-volatiles.

---

This invention relates to novel urethane polymers. More particularly it relates to hydroxyl terminated urethane polymers in the gel state and to stable solutions thereof.

Solutions of urethane polymers have been used in the preparation of coatings to be applied to surfaces. Such coatings because of their excellent adhesion, flexibility and resistance to solvents are being utilized to an increasing degree. However, when applied to porous substrata, e.g. textiles, paper, leather etc. the polymer solutions have the objectional tendency to permeate more or less completely resulting in excessive use of the coating composition and in some instances a stiffening of the coated material. Moreover, some urethane coating compositions "dry" by reaction with atmospheric moisture or oxygen of the air and in such instances it is evident that the portion of the coating composition which penetrates into the porous structure of the material being coated will require extended periods to "dry." Accordingly the physical characteristics of coated porous materials may change as the "drying" process proceeds.

It is an object of this invention to devise novel hydroxyl terminated urethane polymers, in a stable dispersed gel state, suitable for use in the preparation of urethane coatings.

Another object is to devise stable gel dispersions of hydroxyl terminated urethane polymers which on application to porous substrata are substantially non-penetrating.

A still further object is to provide a process for the preparation of stable gel dispersions of hydroxyl terminated urethane polymers.

Other objects and advantages of this invention will be obvious from the following description.

The substantially non-penetrating urethane coating compositions of the present invention are in fact solvent mixtures of two hydroxyl terminated urethane polymers, one of low viscosity and the second of high viscosity admixed to provide the desired viscosity within the predetermined range of non-volatiles. The two urethane polymers are in the gel state and accordingly the resultant mixture is a stable dispersion of the polymer mixture in a volatile organic solvent. The polymer substance is most likely present in the discontinuous phase and the solvent is most likely the continuous phase, since on evaporation of the solvent from a dispersion of this invention, the residue cannot be readily redispersed in the solvent.

The stable hydroxyl terminated urethane polymer gel dispersion adapted for use in the production of non-penetrating urethane coatings are composed of a blend of (1) a low viscosity hydroxyl terminated urethane polymer gel dispersed in a solvent free of active hydrogen containing groups, said viscosity being less than D on the Gardner scale at 20–25% non-volatiles, said hydroxyl terminated urethane polymer having a hydroxyl number in the range of 30 to 40 and (2) a high viscosity hydroxyl terminated urethane polymer gel dispersed in a solvent free of active hydrogen containing groups as determined by the Zerewitinoff method, said viscosity being greater than H on the Gardner scale at 20–25% non-volatiles, said hydroxyl terminated urethane polymer having a hydroxyl number in the range of 30 to 40, said blend having a viscosity within the range of D to H and a hydroxyl number of within the range of 30 to 40.

The urethane polymer mixture of this invention can be obtained by preparing a master batch of polyol-diisocyanate polymer in which the hydroxyl groups predominate. This polymer is prepared in the presence of an organic solvent and the polymerization is carried out preferably in the presence of a catalyst under conditions such that a low viscosity solution of polymer is formed. Portions of this "hydroxyl rich" polymer solution are then separately reacted with additional isocyanate or isocyanate terminated prepolymer to yield both a high viscosity hydroxyl terminated gel dispersion and a low viscosity hydroxyl terminated gel dispersion. Thereafter the low viscosity gel and the high viscosity gel are blended to achieve the desired gel viscosity and non-volatile content.

The polyols used in the preparation of the novel urethane polymer mixture are condensation products of an alkylene oxide having from 2 to 5 carbon atoms such as ethylene oxide, propylene oxide, butylene oxide etc. and mixtures thereof. The product has a molecular weight within the range of 750 to 3000, a hydroxyl number of at least 56 and is essentially trifunctional. Preferably the trifunctional polyol is used in admixture with a low molecular weight diol e.g., ethylene glycol, 1,3 or 1,4-butylene glycol and the like. In addition part or all of the trifunctional polyol condensation product can be substituted for by hydroxyl containing vegetable oils such as castor oil.

The polyol, or mixture of triol and diol, is reacted with an organic polyisocyanate, preferably diisocyanate and especially tolylene diisocyanate, such as the 80–20 mixture of 2,4- and 2,6-tolylene diisocyanates. Other diisocyanates can be used such as for example hexamethylene diisocyanate
phenylene diisocyanate
4,4'-methylene bis(phenylisocyanate)
4,4'-methylene bis(cyclohexylisocyanate)

The hydroxyl rich polymer initially prepared is then reacted with additional polyisocyanate or preferably an isocyanate terminated prepolymer. This prepolymer is a reaction product of an organic diisocyanate with a low molecular weight polyol such as glycerin, trimethylol ethane, trimethylol propane, castor oil, and the like. An excess of the isocyanate component is used and preferably this excess is such as to give a ratio of 2-NCO groups to 1-OH group in the prepolymer.

The organic polyisocyanate used in the preparation of this prepolymer component may be the same or different polyisocyanate used in the preparation of the original polymer, the "hydroxyl rich" polymer.

A catalyst should be used to promote the urethane polymer reaction. While any substance known to promote the urethane reaction can be used such as lead, zinc or cobalt naphthenates and/or octoates the organo-tin catalysts are preferred. Typical examples of such catalysts include:

dibuityl tin dilaurate, dibutyl tin diacetate
tetramethyl tin
dimethyl dioctyl tin
dilauryl tin difluoride
di-(-2-ethylhexyl)tin bis(monobutyl maleate)
tri-n-butyl tin acetate Mixtures of these and equivalent catalytic substances are contemplated in this connection also.

I have found that the amount of catalyst as well as the time of addition of the catalyst has an effect upon the character of the gel state of the hydroxyl terminated polymer. Alhough in the preparation of the "hydroxyl rich" polymer normal amounts, i.e. from about 0.05 to 0.2% by weight of the polyol-isocyanate mixture are used, in the preparation of the "hydroxyl terminated" polymer only relatively minor amounts of catalyst are required, i.e. amounts of the order of 0.0001% to about 0.001% are required. Moreover I have found that increasing the catalyst concentration in this step results in a polymer mixture of lower viscosity. Its effect in this step appears to be that of controlling the gelation of the urethane polymer. Since if the "hydroxyl rich" polymer and the isocyanate prepolymer be reacted in the absence of even this small amount of "catalyst" a solid gel state often results, which could not be dispersed in stable dispersion by further solvent addition. The controlling effect by the catalyst concentration can also be demonstrated by carrying out the reaction between the "hydroxyl rich" polymer (Part A) and isocyanate prepolymer in two instances, both identically processed execpt that the amount of catalyst used in one is double that used in the other. The polymer obtained in the instance wherein more catalyst is used has a lower gel state viscosity than that in which less catalyst is used.

Analogously the proportion of isocyanate or isocyanate terminated prepolymer used in the preparation of hydroxyl terminated urethane polymer gel has an effect upon the viscosity of the resultant gel. In this instance, the effect is a direct one, i.e., the more of the isocyanate component used the greater the viscosity of the gel. Inasmuch as the viscosity characteristic of the gel cannot be predicted with certainity this parameter can be varied by adjusting the proportion of the isocyanate component. In carrying out the processs of my invention, I prefer to adjust the viscosity of the polymer gel upwards by increasing the proportion of the isocyanate component, and to adjust the viscosity downwards by increasing the catalyst concentration in the second preparation of the hydroxyl terminated urethane polymer gel. Thereafter by blending the two gels, one of relatively high viscosity and the other of relatively low viscosity, I can obtain a stable urethane polymer gel dispersion of the desired viscosity.

A solvent is present in both steps of this process. This component should be substantially free of active hydrogen (as determined by the Zerewitinoff Method described by Kobler et al. J.A.C.S. 40 3181) which would react with the isocyanate used. Typical of suitable solvent are the following mentioned methylacetate
ethylacetate
methylethyl ketone
cyclohexanone
ethylene glycol monoethyl ether acetate (Cellosolve acetate)

Mixtures of these and equivalent solvents can also be used.

The temperatures at which these reactions can be carried out may vary over a broad range, from ambient to 100° C. or more. Preferably a temperature of about 50°–75° C., and especially 60–65° C. is used. The reaction rate is inordinately slow at ambient or lesser temperatures while it proceeds at a very rapid rate at temperatures above 100° C. Hence, it is generally convenient from the point of view of controlling the polymerization rate to carry out the reaction at a modest temperature, e.g., 50 to 75° C.

The polymer systems involved in this invention are sensitive to minor differences in moisture content, acid and hydroxyl numbers of the polyol components as well as the solvent. Accordingly it is suggested that substantially anhydrous materials of controlled moisture, acidity and hydroxyl values be used, so far as is possible.

The following example will illustrate the present invention. Parts and percentages are by weight and temperatures are given in degrees centigrade. Viscosity is measured by the Gardner-Holdt Viscosimeter (Physical & Chemical Examination of Paints, etc. 12th edition 1962).

EXAMPLE I

*Part A.*—To a mixture of 75.8 parts of polyoxypropylene triol (hydroxyl number of 156.1 moisture content of 0.03% and acid number of 0.03), 5.2 parts of 1,3-butylene glycol, 0.1085 part of dibutyl tin dilaurate and 100 parts of ethyl acetate at 25°, 19 parts of an 80–20 mixture of 2,4- and 2,6-tolylene diisocyanates are added. The mixture is heated to and agitated at 65° for five hours. The resultant hydroxyl rich urethane polymer is cooled at 25° and is adjusted to a non-volatile content of 50% by addition of ethyl acetate. The viscosity (Gardner-Holdt Scale) at 25° is A⁻ to A.

*Part B.*—A mixture of 45.6 parts of the solution of hydroxyl rich polymer prepared above (Part A) 31.2 parts of ethyl acetate and 0.000156 part of dibutyl tin dilaurate is agitated vigorously while being heated to 65°. At this temperature a solution of 4.1 parts of an isocyanate terminated tolylene diisocyanate-trimethylol propane (amine equivalent of 389, percent NCO=10.8) in 19 parts of ethylacetate is added, and the mixture is agitated at 65° to 70° for about 5 hours. The viscosity of the mass has become constant and is O–P. and the hydroxy terminated polymer is in a stable uniform gel state.

*Part C.*—The procedure of Part B is repeated using 0.000312 part of dibutyl tin dilaurate. The resultant hydroxyl terminated polymer obtained has a viscosity of F–G.

*Part D.*—Equal parts of the high viscosity hydroxyl terminated polymer prepared in Part B above and the low viscosity product of Part C are blended together at ambient temperature. The resulting blend has a viscosity of G–H. at 20% non-volatiles content, and is a gel dispersion of excellent stability. This product when applied to uncoated paper by means of the "draw-down" technique with a knife edge and after permitting the solvent to evaporate in air, gives no discernible penetration by visual examination of the underside of the test paper.

It can thus be seen that a novel and effective procedure has been devised for the preparation of valuable stable hydroxyl terminated urethane polymer gel dispersions from which non-penetrating urethane coating compositions can be prepared.

Although certain preferred embodiments of the invention have been disclosed and illustrated in the example, it will be evident that various changes and modifications in these details may be made without departing from the scope or spirit of my invention.

I claim:

1. The stable hydroxyl terminated urethane polymer gel dispersion adapted for use in the production of non-penetrating urethane coatings composed of a blend of (1) a low viscosity hydroxyl terminated urethane polymer gel dispersed in a solvent free of active hydrogen containing groups as determined by the Zerewitinoff method, said viscosity being less than D on the Gardner-Holdt scale at 20–25% non-volatiles, said hydroxyl terminated urethane polymer having a hydroxyl number in the range of 30 to 40 and (2) a high viscosity hydroxyl terminated urethane polymer gel dispersed in a solvent free of active hydrogen containing groups as determined by the Zerewitinoff method, said viscosity being greater than H on the Gardner-Holdt scale at 20–25% non-volatiles, said hydroxyl terminated urethane polymer having a hydroxyl number in the range of 30 to 40, said blend having a viscosity within the range of D to H and a hydroxyl number of within the range of 30 to 40.

2. The stable hydroxyl terminated urethane polymer gel dispersion as claimed in claim 1 wherein the urethane polymer is the reaction product of an organic polyisocyanate with a polyol which is the condensation product of an alkylene oxide having from 2 to 5 carbon atoms with an organic trihydroxy compound, said trifunctional polyol having a molecular weight within the range of 750 to 3000.

3. A gel dispersion as in claim 2 wherein the polyol is polyoxypropylene triol and the organic polyisocyanate is tolylene diisocyanate.

References Cited

UNITED STATES PATENTS

| | | | |
|---|---|---|---|
| 2,912,408 | 11/1959 | Nischk et al. | 264—858 |
| 2,948,961 | 8/1960 | Windemuth et al. | 260—33.6 |
| 3,012,987 | 12/1961 | Ansul | 260—31.2 |
| 3,049,515 | 8/1962 | Damusis | 260—77.5 |

FOREIGN PATENTS 1,309,892  10/1962  France.

MORRIS LIEBMAN, *Primary Examiner.*

B. A. AMERNICK, *Assistant Examiner.*